(12) United States Patent  (10) Patent No.: US 8,141,779 B1
Gudenburr et al.  (45) Date of Patent: Mar. 27, 2012

(54) SENSOR AND MARKERS FOR SPEED FEEDBACK IN A HAND-OPERATED DOCUMENT READER/IMAGER

(75) Inventors: John C. Gudenburr, Canton, MI (US); Michael J. Moore, Beverly Hills, MI (US); Sammy C. Hutson, Novi, MI (US); William Kozlowski, Novi, MI (US)

(73) Assignee: Burroughs Payment Systems, Inc., Plymouth, MI (US)

( * ) Notice: Subject to any disclaimer, the term of this patent is extended or adjusted under 35 U.S.C. 154(b) by 1257 days.

(21) Appl. No.: 11/894,017

(22) Filed: Aug. 17, 2007

(51) Int. Cl.
*G06K 7/08* (2006.01)

(52) U.S. Cl. .................. 235/449; 235/493; 235/379

(58) Field of Classification Search .................. 235/449, 235/493, 379
See application file for complete search history.

(56) References Cited

U.S. PATENT DOCUMENTS

| | | | | |
|---|---|---|---|---|
| 4,617,457 A | * | 10/1986 | Granzow et al. | 235/379 |
| 5,054,092 A | * | 10/1991 | LaCaze | 382/139 |
| 5,121,437 A | * | 6/1992 | Mazumder | 382/139 |
| 5,514,467 A | * | 5/1996 | Berkes et al. | 428/840 |
| 5,616,911 A | * | 4/1997 | Jagielinski | 235/493 |
| 6,580,581 B1 | * | 6/2003 | Bui et al. | 360/78.02 |
| 6,956,962 B1 | * | 10/2005 | Hayosh | 382/139 |
| 7,922,098 B1 | * | 4/2011 | Ma et al. | 235/493 |
| 2003/0059099 A1 | * | 3/2003 | Tateishi | 382/139 |
| 2009/0059422 A1 | * | 3/2009 | Ikeda et al. | 360/119.01 |

* cited by examiner

*Primary Examiner* — Allyson Trail
(74) *Attorney, Agent, or Firm* — Honigman Miller Schwartz and Cohn LLP

(57) ABSTRACT

A hand-operated document processor includes a base for receiving a document containing magnetic ink character data to be read and recognized, and a manually operated moving magnetic ink character recognition (MICR) subsystem. The subsystem includes a MICR read head. Movement of the subsystem causes the MICR read head to pass over the magnetic ink character data on the document. The base further includes a series of embedded markers that may be magnetic or optical. A speed sensing sensor is positioned such that the speed sensing sensor passes over the series of markers as the MICR read head passes over the magnetic ink character data on the document. MICR reading and recognition logic receives the signal from the MICR read head and the signal from the speed sensing sensor to provide position feedback information to the logic for use during character data recognition.

34 Claims, 7 Drawing Sheets

SENSOR AND MARKERS FOR SPEED FEEDBACK IN A HAND-OPERATED DOCUMENT READER/IMAGER

BACKGROUND OF THE INVENTION

1. Field of the Invention

The invention relates to document processing, document imaging, and magnetic ink character recognition. The invention further relates to hand-operated document readers/imagers, and to methods and systems for providing speed feedback in a hand-operated document reader/imager.

2. Background Art

A typical document processing system includes a feeder and a separator in the document-feeding portion of the system, and a series of roller pairs or belts in the document-transporting portion of the system. In the feeding portion of the system, the feeder acts with the separator to feed documents singly, in order, from a stack. In the transporting portion of the system, the roller pairs and/or belts convey the documents, one at a time, past other processing devices such as readers, printers, and sorters that perform operations on the documents. The feeder is typically a feed wheel, but may take other forms. The separator may be a wheel, but also may take other forms such as a belt. Further, the components in the transporting portion of the system may take a variety of forms.

In addition to large document processing systems that handle stacks of documents, smaller systems also exist. These smaller document processing systems may handle smaller stacks of documents, or may even handle single documents, fed one at a time. There are also hand-operated document readers/imagers.

Banks, credit unions, and other financial institutions use document processing systems to regularly process checks, deposit slips, and other types of bank documents in order to execute financial transactions efficiently. Document processing systems have therefore become quite prevalent in the industry. Typically, information is printed on these documents in magnetic ink which can be read both by the human eye and a computer. This form of printing is read by a process called magnetic ink character recognition (MICR). As part of the recognition process, a MICR magnetic read head is used to read the information printed on the document.

Conventional approaches to MICR reading and recognition generally involve determining peak position information for a waveform generated by a single gap magnetic read head. This peak information typically includes information regarding the amount of time between the peaks of each character. Knowledge of the velocity of the document (and thus, the velocity of the characters which are printed on the document) allows this time information to be converted into distance information, which can be compared to the MICR character peak profiles as contained in ANS X9.100-20-2006 (formerly published as X9.27) "Print and Test Specifications for Magnetic Ink Printing (MICR)" as published by Accredited Standards Committee X9, Inc., Annapolis, Md., United States. Based on the design of the standard E-13B character set, in order that a MICR reader reliably read with a high correct character read rate and with a very low substitution rate, the document velocity must be precisely known during reading or otherwise be speed-controlled so that it does not vary.

These conventional approaches are acceptable when the velocity of the document is either known or can be controlled. In fact, conventional approaches to MICR typically involve rather complex schemes for controlling the velocity of the document or attempting to measure its velocity at different times as the document moves past the MICR read head. There has also been an approach to MICR reading and recognition that utilizes a dual gap read head to eliminate the need for precise knowledge or control of the document velocity.

In a hand-operated document reader/imager, the document is placed on a base and the MICR/image device is moved over the document from right to left, which is the traditional direction of larger document readers. During this movement, the MICR characters are recognized and the front image of the document is captured.

A hand-operated document reader/imager requires a method of determining the position, and thus the speed, of the MICR and image sensors due to the variable speed nature of the manual operation. Existing solutions use optical encoders to provide this position feedback. Optical encoders are typically attached directly to the shaft of a wheel that moves along the document being scanned, or are connected to this shaft through a series of gears. These existing solutions have several shortcomings. Dust can build up in the optical encoder and cause position feedback errors. To avoid dust buildup, optical encoders need to be cleaned regularly or sealed in a dust-free enclosure, which adds cost. Also, the wheel must be in contact with the document, which may cause the document to move in such a way as to reduce the quality of the scan result. In addition, the wheel may slip, which will cause position feedback errors.

For the foregoing reasons, there is a need for an improved method and system for providing speed feedback in a hand-operated document reader/imager.

SUMMARY OF INVENTION

It is an object of the invention to provide an improved method and system for providing speed feedback in a hand-operated document reader/imager.

One embodiment of the invention comprehends embedding magnetic markers in the base of a hand-operated document reader/imager, and adding a separate (or dual-channel) magnetic read head, to provide speed feedback in the hand-operated document reader/imager. According to this embodiment of the invention, the magnetic read head and magnetic markers are essentially unaffected by dust. Advantageously, the additional magnetic read head need not be in contact with the document being scanned. In this way, position errors that result from optical encoder wheels are eliminated. Further, the embedded magnetic markers and additional separate (or dual-channel) magnetic read head may be constructed with less cost than a customized optical encoder solution.

It is appreciated that these magnetic markers may take the form of magnetic material (for example, MICR ink) that is embedded in the base of the device and magnetized by a permanent magnet. Alternatively, the magnetic markers could be recorded on magnetic tape or a magnetic stripe (for example, as found on a credit card).

Another embodiment of the invention comprehends embedding a linear strip of optical markers in the base of a hand-operated document reader/imager, and adding a reflective optical sensor, to provide speed feedback in the hand-operated document reader/imager. Advantageously, the reflective optical sensor need not be in contact with the document being scanned. In this way, position errors that result from optical encoder wheels are eliminated. Further, the embedded optical markers and additional reflective optical sensor may be constructed with less cost than a customized optical encoder solution.

Embodiments of the invention provide the needed speed feedback to allow the MICR code line to be read/recognized (converted to text characters) according to a traditional MICR algorithm. This speed feedback may also be utilized to enhance image capture.

DETAILED DESCRIPTION OF THE PREFERRED EMBODIMENTS

The E-13B character set contains ten characters and four symbols as defined in the ANS X9.100-20-2006 (formerly published as X9.27) "Print and Test Specifications for Magnetic Ink Printing (MICR)" as published by Accredited Standards Committee X9, Inc., Annapolis, Md., United States. When used on a document for automated machine reading, the characters and symbols in the set must be printed using magnetic ink. ANS X9.100-20-2006 defines the dimensions of each character/symbol and the expected nominal waveform peak position and relative amplitude of waveform peaks.

Figure 1:
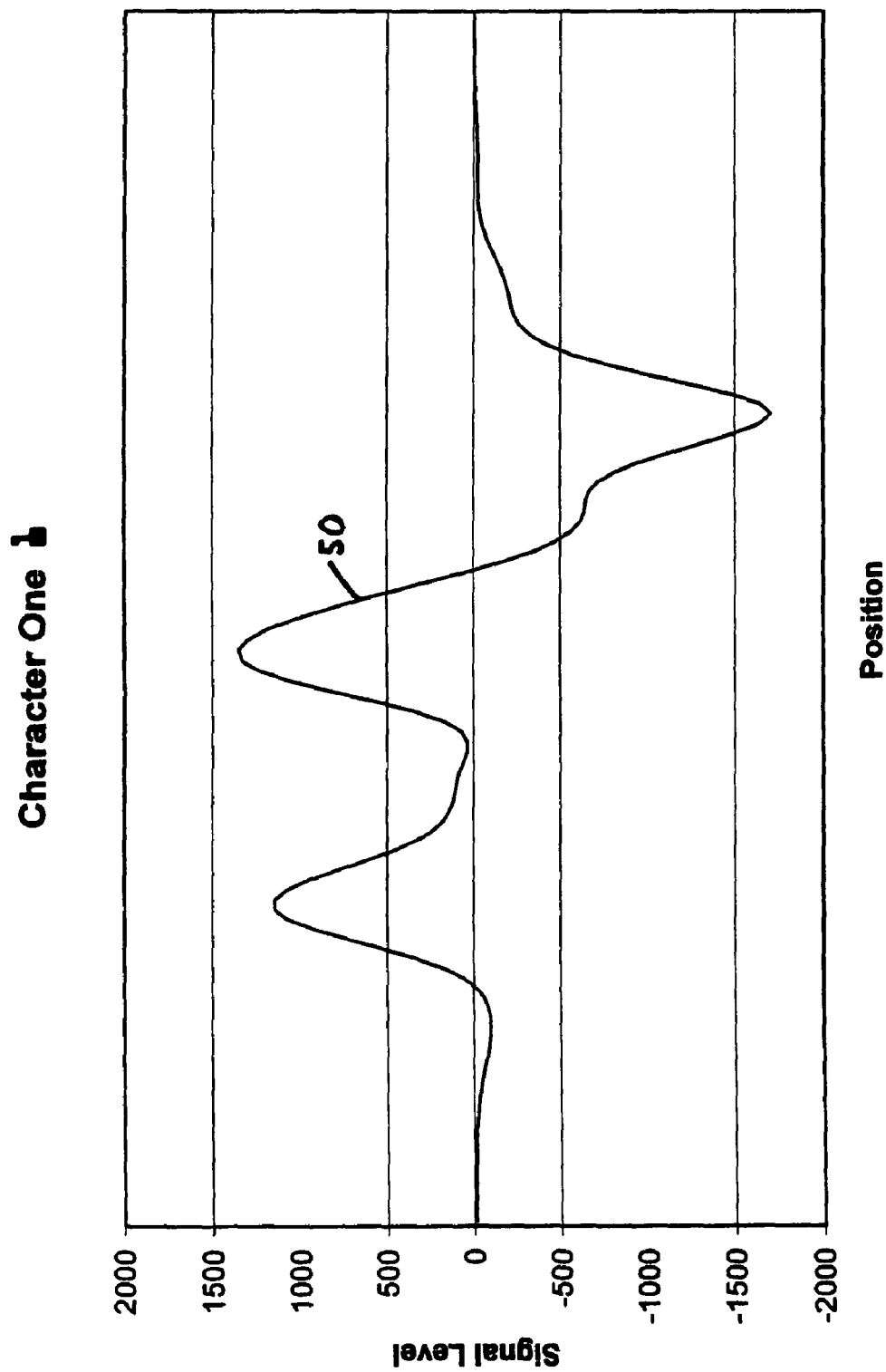
FIG. 1 shows the waveform for the magnetic ink character one, from the E-13B MICR character set as used on many financial payment documents, as read from a responsive magnetic signal gap read head when the magnetized character is passed by the magnetic read head.

FIG. 1 shows the waveform for the magnetic ink character one, from the E-13B MICR character set, as read from a responsive magnetic signal gap read head when the magnetized character is passed by the magnetic read head. The waveform is indicated at 50. As illustrated, the x-axis represents the position of the read head, and the y-axis represents the signal level.

MICR reading and recognition generally involves determining peak position information for a waveform generated by a single gap magnetic read head that passes over the magnetic ink characters on a document. This peak information typically includes information regarding the amount of time between the peaks of each character. Knowledge of the velocity of the document (and thus, the velocity of the characters which are printed on the document) allows this time information to be converted into distance information, which can be compared to the MICR character peak profiles as contained in ANS X9.100-20-2006.

Figure 2:
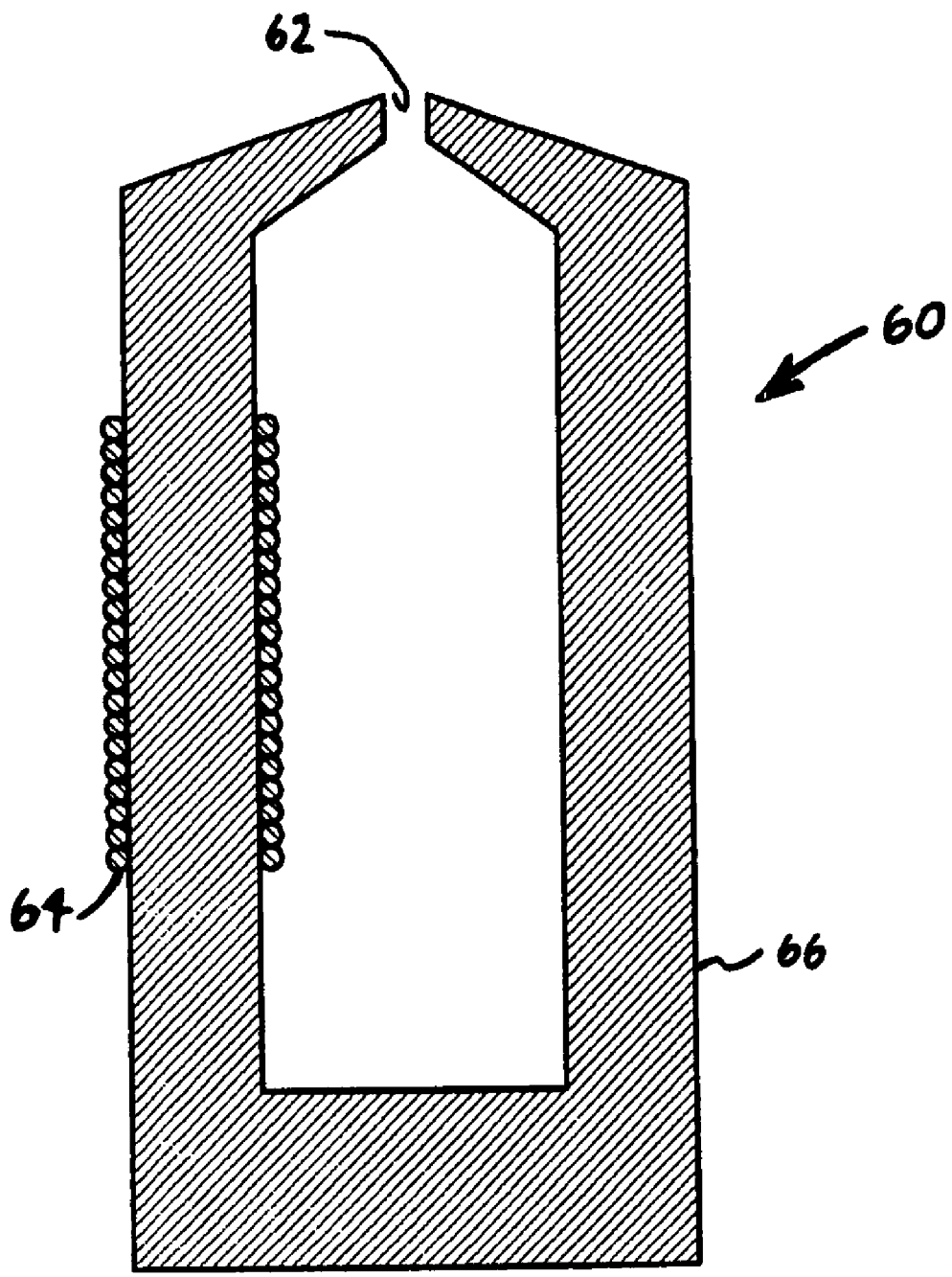
FIG. 2 is a cross-section view of a read head, which is one example of a suitable read head for reading magnetic ink characters.

In FIG. 2, a read head is generally indicated at 60, and includes a gap 62. The read head utilizes sensing coil 64. Core 66 forms a path for the magnetic flux changes experienced when the reader passes over magnetic ink. Of course, it is appreciated that alternative readers may be used, and any suitable technique may be utilized for assuring that flux variation from the magnetic ink characters is sensed.

Figure 3:
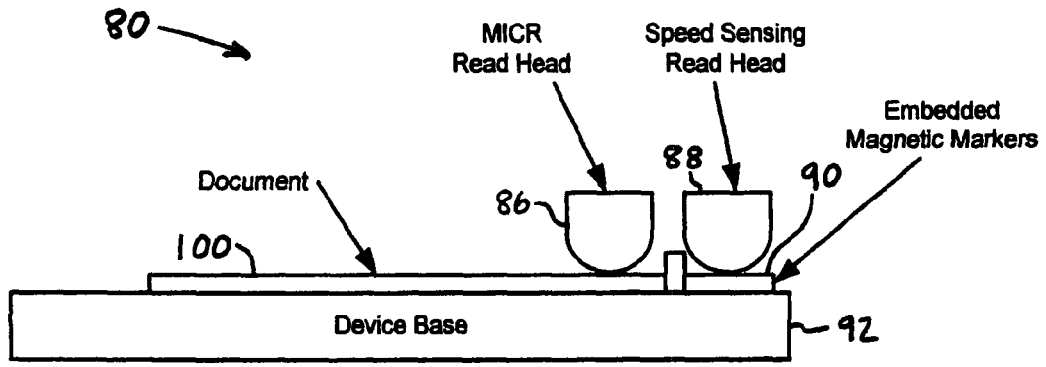
FIG. 3 illustrates a side view of a hand-operated document reader/imager made in accordance with the invention.
Figure 4:
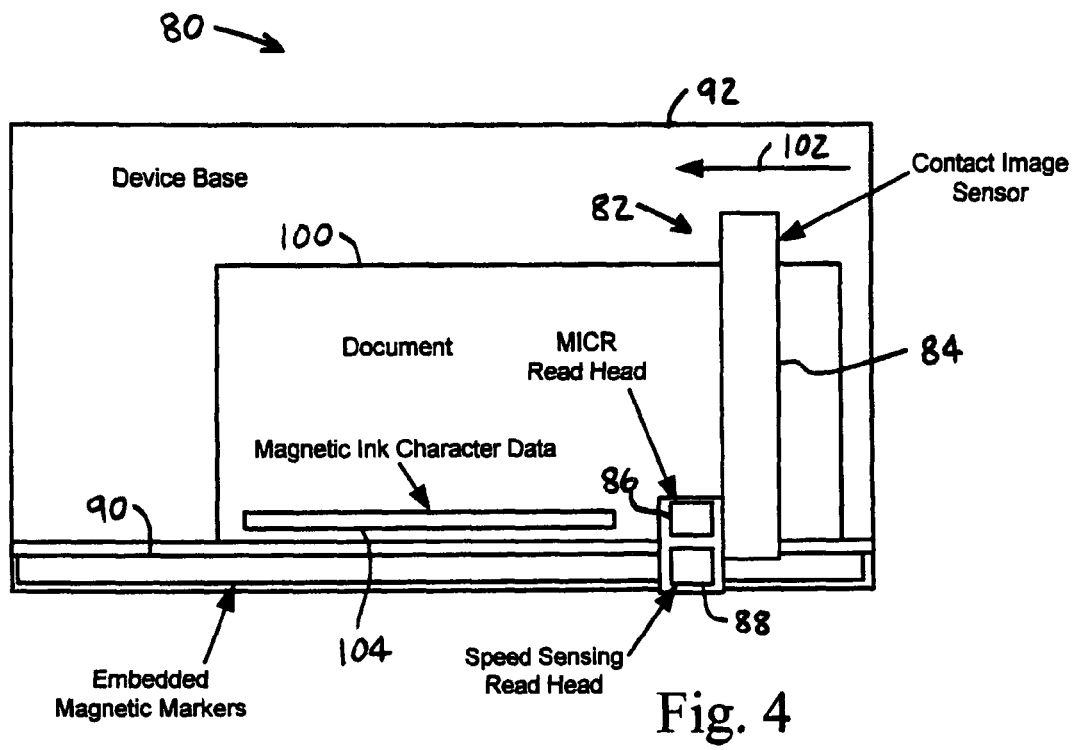
FIG. 4 illustrates a top view of a hand-operated document reader/imager made in accordance with the invention.

An exemplary embodiment of the invention is illustrated in FIGS. 3-6. FIGS. 3 and 4 illustrate a hand-operated document reader/imager 80. As best shown in FIG. 4, document reader/imager 80 includes a moving MICR/image subsystem 82. Subsystem 82 includes a contact image sensor 84, a MICR read head 86, and a speed sensing read head 88. Contact image sensor 84 captures an image of the document 100 when subsystem 82 is moved across the document 100. Contact image sensor 84 captures the front image of the document 100 when the document 100 is placed face-up on the base 92 of the reader/imager 80 and the MICR/image subsystem 82 is moved from right to left over document 100 as indicated by arrow 102.

MICR read head 86 is for reading the magnetic ink character data 104 on document 100. During the front image capture, the MICR code line is read according to a traditional MICR algorithm as MICR read head 86 passes from right to left over the magnetic ink character data 104 on document 100.

With continuing reference to FIGS. 3 and 4, document reader/imager 80 includes embedded magnetic markers 90 in its base 92. Speed sensing read head 88 and magnetic markers 90 are used to provide the speed feedback to the MICR reading and recognition logic of the hand-operated document reader/imager 80. Embodiments of the invention provide the needed speed feedback to allow the MICR code line to be read/recognized (converted to text characters) according to a traditional MICR algorithm. This speed feedback may also be utilized to enhance image capture. FIG. 3 shows the document reader/imager 80 from the side view. Only the MICR read head 86 and speed sensing read head 88 of the moving MICR/image subsystem are shown in FIG. 3 to clearly depict the speed sensing read head 88 positioned along the strip of embedded magnetic markers 90 and the MICR read head 86 positioned along the edge of the document 100.

In more detail, a hand-operated document reader/imager requires a method of determining the position, and thus the speed, of the MICR and image sensors due to the variable speed nature of the manual operation. In the illustrated embodiment of the invention in FIGS. 3-6, the embedded magnetic markers 90 are sensed by the speed sensing read head 88 to provide position feedback which allows the speed of the MICR and image sensors to be determined. The MICR read head 86 and speed sensing read head 88 may be separate read heads or may compose a dual-channel magnetic read head to provide the required speed feedback.

It is appreciated that these magnetic markers 90 may take the form of magnetic material (for example, MICR ink) that is embedded in the base 92 of the document reader/imager 80 and magnetized by a permanent magnet. Alternatively, the magnetic markers 90 could be recorded on magnetic tape or a magnetic stripe (for example, as found on a credit card) located/embedded at the base 92. Advantageously, the speed sensing magnetic read head 88 and magnetic markers 90 are essentially unaffected by dust. In addition, the additional magnetic read head need not be in contact with the document 100 being scanned. In this way, position errors that result from optical encoder wheels are eliminated.

Figure 5:
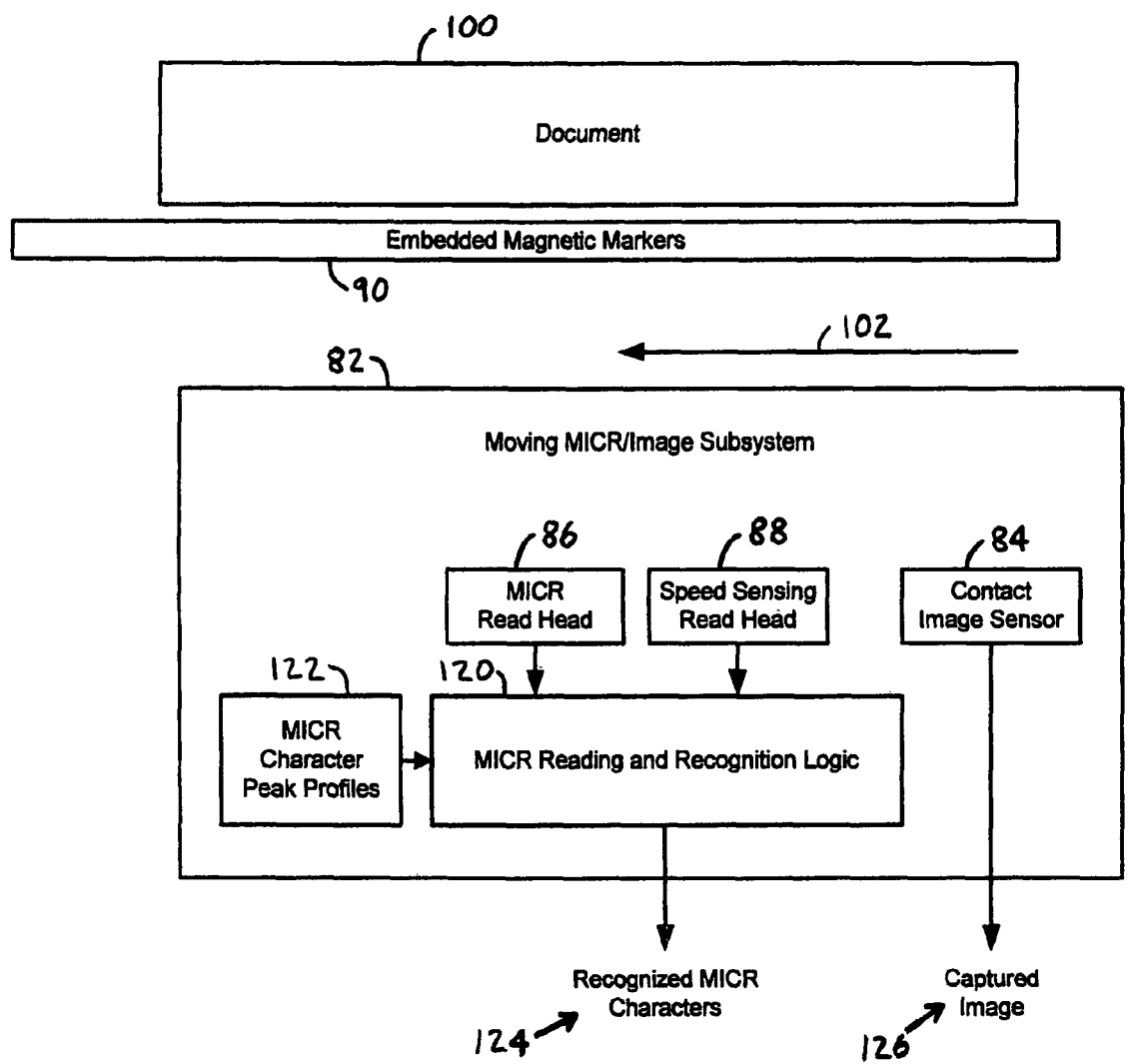
FIG. 5 is a block diagram illustrating a moving MICR/image subsystem including a speed sensing magnetic read head for providing speed feedback to the MICR reading and recognition logic.

FIG. 5 illustrates the moving MICR/image subsystem 82 in block diagram form, including the contact image sensor 84, MICR read head 86, and speed sensing read head 88. As shown, the document 100 is placed on the base of the reader/imager for front image capture. Moving MICR/image subsystem 82 is moved across the document as indicated by arrow 102. Block 120 represents the MICR reading and recognition logic. Logic 120 includes a traditional MICR algorithm as understood by one of ordinary skill in the art.

In the traditional MICR algorithm, the waveform obtained from the read head 86 is compared against known MICR character peak profiles 122. If the recognition is successful, the MICR reading and recognition logic 120 determines the recognized MICR characters 124. The traditional MICR algorithm is applied during the front image capture by contact image sensor 84 of a face-up document. The captured image is indicated at 126.

Logic 120 must be capable of determining the speed of the MICR and image sensors due to the variable nature of the manual operation. Traditionally, an optical encoder provides position feedback that allows determination of the speed of the sensors. Such an optical encoder is typically attached directly to the shaft of a wheel that moves along the document being scanned, or is connected to this shaft through a series of gears. To avoid shortcomings of such an arrangement, in accordance with the invention, speed sensing read head 88 detects embedded magnetic markers 90 and provides the required position feedback to logic 120.

Figure 6:
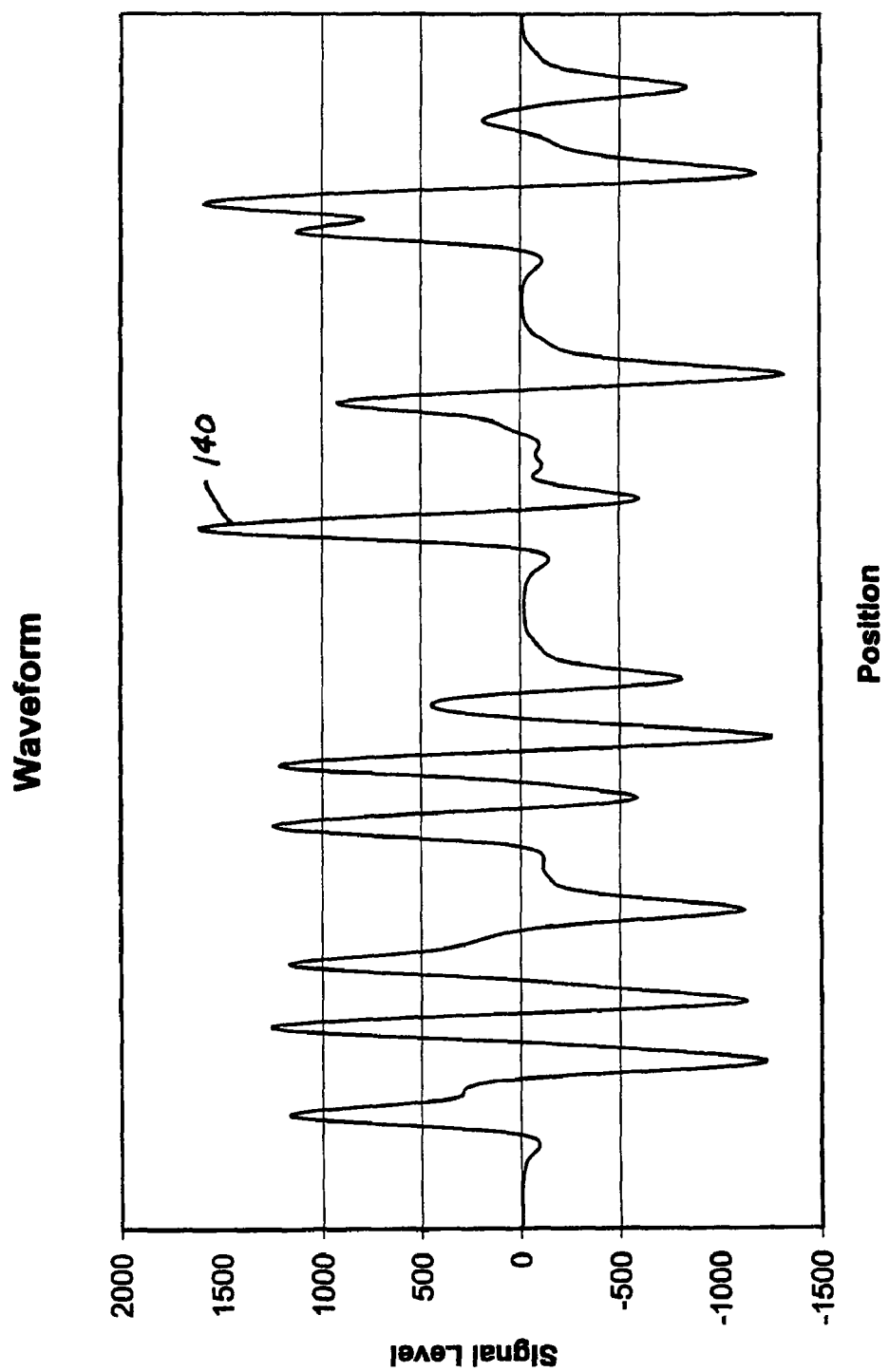
FIG. 6 illustrates a waveform for magnetic ink characters/symbols 3, 5, 7, Amount when the document containing the characters/symbols is inserted face up for front image capture in the hand-operated document reader/imager, and the magnetic ink characters/symbols are passed over from right to left.

FIG. 6 illustrates a waveform 140 for magnetic ink characters/symbols 3, 5, 7, Amount when the document containing the characters/symbols is inserted face up for front image capture in the hand-operated document reader/imager, and the magnetic ink characters/symbols are passed over from right to left. As illustrated, the x-axis represents the position of the read head, and the y-axis represents the signal level. The MICR reading and recognition logic is able to produce the waveform depicted at 140 based on the signal from the MICR read head and the signal from the speed sensing read head that detects the embedded magnetic markers. In this way, the MICR reading and recognition logic can consider the MICR read head speed during reading and recognition. Consideration of MICR read head speed is required because speed variations affect the amount of time between the peaks of each character (as well as the amplitudes of the peaks due to the variation in the rate of change of the magnetic flux resulting from the variation in the read head speed). By considering the read head speed, the time information is able to be converted into distance information, which can be compared to the MICR character peak profiles as contained in ANS X9.100-20-2006.

In one implementation, in order to obtain optimal MICR results, the MICR read head signal is sampled at a resolution of 1,000 samples per inch. When the relative speed of the document is known and constant, the desired MICR sampling rate in samples/second is determined by converting from samples per inch to samples per second based on the constant speed. For example, if the relative speed difference between the document and the MICR read head is 20 inches per second, the MICR sampling rate must be 20,000 samples per second to achieve the desired 1,000 samples per inch.

In a hand-operated document reader/imager, the relative speed of the document is not constant, and the speed must be sensed and considered. In one approach to considering the MICR read head speed during reading and recognition, the sampling rate of the MICR subsystem is varied based on the sensed speed. For example, in order to achieve 1,000 samples per inch, a speed feedback mechanism commands the MICR sampling subsystem to sample every 0.001 inches. In the embodiment of the invention illustrated in FIGS. 3-6, this speed feedback is provided by the speed sensing read head 88 and embedded magnetic markers 90. Similarly, speed feedback could be used to command the imaging subsystem to achieve a desired samples/inch resolution.

Figure 7:
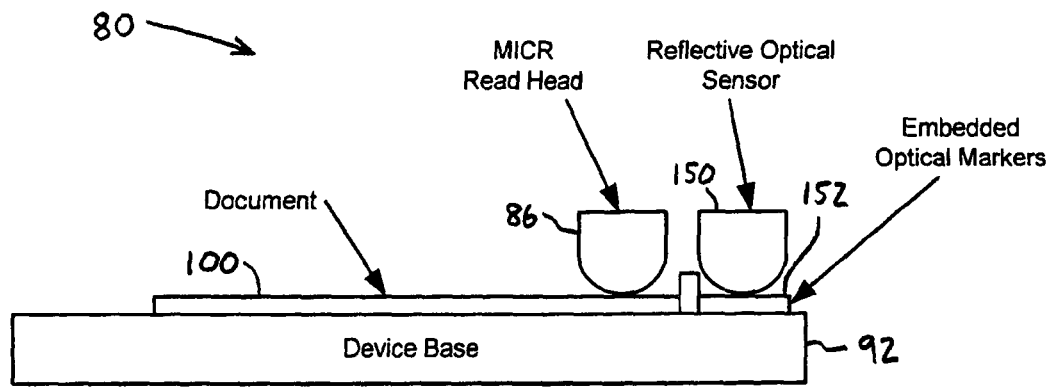
FIG. 7 illustrates a side view of a hand-operated document reader/imager made in accordance with a second embodiment of the invention.
Figure 8:
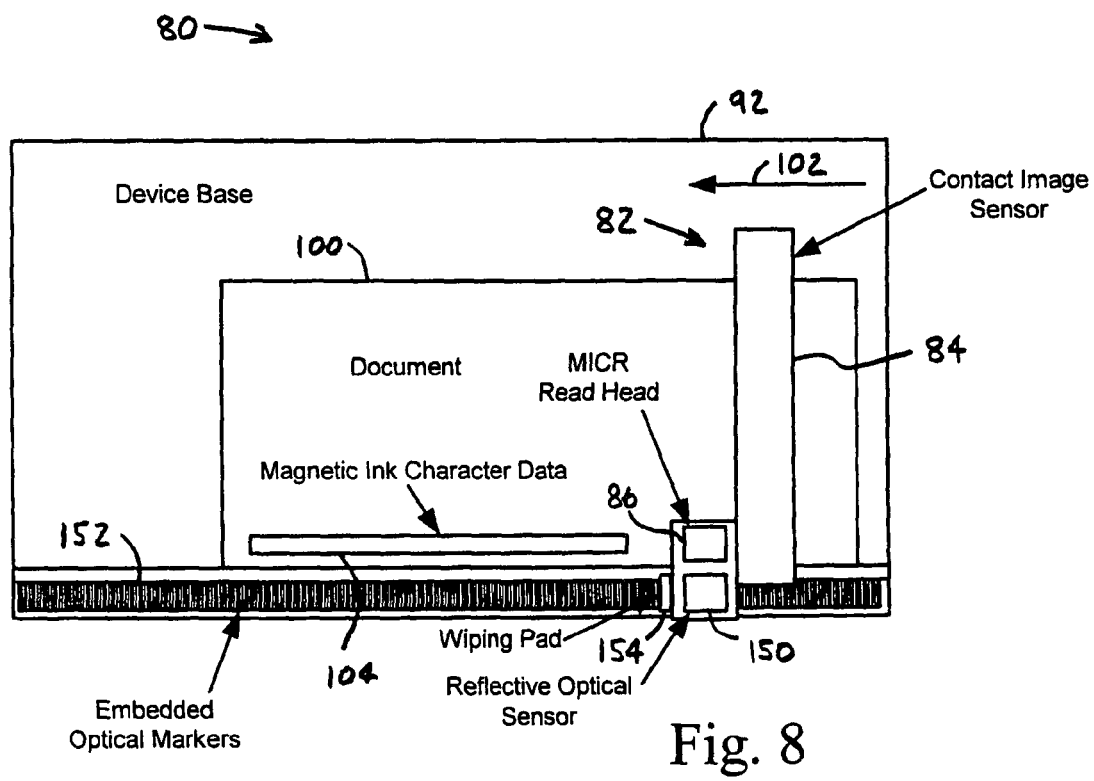
FIG. 8 illustrates a top view of a hand-operated document reader/imager made in accordance with the second embodiment of the invention.

A second embodiment of the invention is illustrated in FIGS. 7-10. FIGS. 7 and 8 illustrate the hand-operated document reader/imager 80, including moving MICR/image subsystem 82 having contact image sensor 84, MICR read head 86, and a speed sensing reflective optical sensor 150. Document reader/imager 80, in the embodiment of FIGS. 7-10, includes embedded optical markers 152 in its base 92. Speed sensing reflective optical sensor 150 and optical markers 152 are used to provide the speed feedback to the MICR reading and recognition logic of the hand-operated document reader/imager 80.

FIG. 7 shows the document reader/imager 80 from the side view. Only the MICR read head 86 and reflective optical sensor 150 of the moving MICR/image subsystem are shown in FIG. 7 to clearly depict the reflective optical sensor 150 positioned along the strip of embedded optical markers 152 and the MICR read head 86 positioned along the edge of the document 100.

In more detail, a hand-operated document reader/imager requires a method of determining the position, and thus the speed, of the MICR and image sensors due to the variable speed nature of the manual operation. In the illustrated embodiment of the invention in FIGS. 7-10, the embedded optical markers 152 are sensed by the reflective optical sensor 150 to provide position feedback which allows the speed of the MICR and image sensors to be determined.

Figure 9:
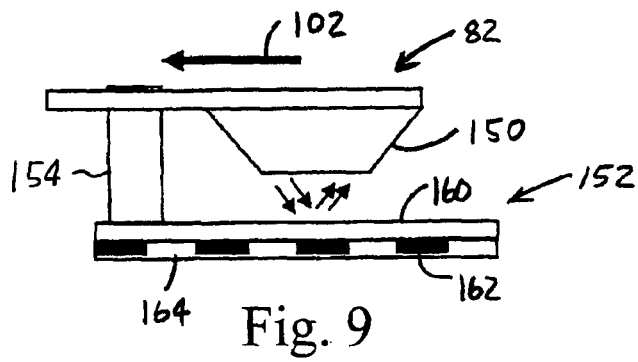
FIG. 9 illustrates an exemplary implementation of the reflective optical sensor.

As best shown in FIG. 9, the embedded linear strip of optical markers 152, in the illustrated embodiment, contains a non-reflective (for example, black) high-resolution line-pair pattern 162 applied to one side of a durable, clear substrate such as a mylar polyester film 160. The line-pair pattern 162 is applied to the linear strip in a very precise manner to obtain consistent spacing between lines. For example, a 250 cycles per inch (CPI) pattern uses 0.002 inch lines separated by 0.002 inch spaces. A reflective (for example, white) background 164 is then applied over the line pair pattern 162 in order to create a high contrast between the lines. The embedded linear strip 152 is attached to the base 92 of the hand-operated document reader/imager 80 with the clear side 160 facing up in order to protect the applied pattern from wear and to allow easy cleaning. The reflective optical sensor 150 is then used to sense the lines on the embedded linear strip 152 as the sensor moves past them. In order to keep the embedded linear strip 152 clean during operation, a low cost foam or felt pad 154 is attached to the moving MICR/image subsystem 82 which wipes the top of the embedded linear strip 152 during operation as shown.

In order to provide the MICR subsystem with a sample command every 0.001 inches, a dual-channel quadrature reflective sensor is used. In a quadrature encoder, the two channels are separated by a distance equivalent to one-half the width of the lines used in the linear strip 152. One channel senses the edge of a line one-quarter of a cycle before the other channel. In this manner, the absolute resolution is increased. Thus, the reflective sensor and embedded linear optical strip are designed for a resolution of 250 CPI to achieve a resolution of 1,000 samples/inch.

Figure 10:
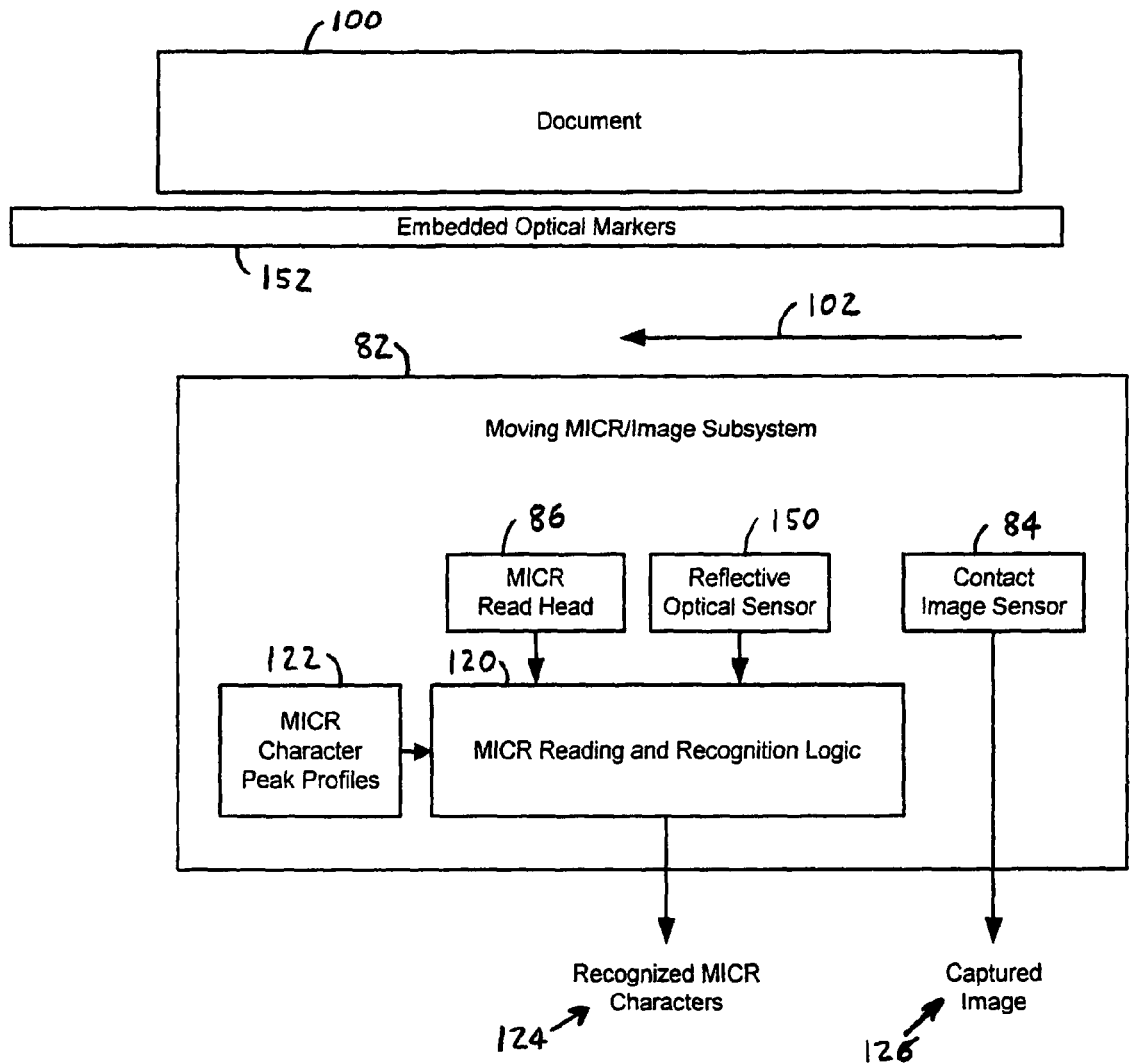
FIG. 10 is a block diagram illustrating a moving MICR/image subsystem including a reflective optical sensor for providing speed feedback to the MICR reading and recognition logic.

FIG. 10 illustrates the moving MICR/image subsystem 82 in block diagram form, including the contact image sensor 84, MICR read head 86, and speed sensing reflective optical sensor 150. Logic 120 must be capable of determining the speed of the MICR and image sensors due to the variable nature of the manual operation. In accordance with the invention, speed sensing reflective optical sensor 150 detects embedded optical markers 152 and provides the required position feedback to logic 120. In the embodiment of the invention illustrated in FIGS. 7-10, the speed feedback is provided by the reflective optical sensor 150 and embedded optical markers 152 to command the MICR subsystem to achieve a desired samples/inch resolution. Similarly, speed feedback could be used to command the imaging subsystem to achieve a desired samples/inch resolution.

It is appreciated that the optical markers could be manufactured into the base of the hand-operated reader/imager in a variety of ways. For example, over-molding, laser etching, pad printing, or silk-screening may be used. Further, in an alternative implementation, a transmissive-type optical sensor could be used. This type of sensor has a slot in which the linear optical strip must be positioned, and the reflective background is omitted. The light from one side of the sensor shines through the strip onto the other side of the sensor. This type of configuration can provide higher cycle per inch resolutions; however, this arrangement may be more difficult to keep clean.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An apparatus for processing a document including magnetic ink character data, comprising:
  a hand-operated document processor including
    a base including
      a series of embedded magnetic markers, and
      a support surface for supportably-receiving the document; and
    a magnetic ink character recognition (MICR) subsystem movably-attached to the base such that the MICR subsystem is movable relative to the document, wherein the MICR subsystem includes
      a MICR read head,
      MICR reading and recognition logic communicatively-coupled with the MICR read head for receiving a signal from a MICR read head, and
      a speed sensing magnetic read head positioned for communication with the series of magnetic markers of the base for providing position feedback information to the MICR reading and recognition logic for use during character data recognition as the MICR read head passes over the document including the magnetic ink character data.

2. The apparatus of claim 1, wherein the MICR subsystem further comprises
  an image sensor, wherein the image sensor is coupled to the MICR read head such that the MICR read head is permitted to pass over the magnetic ink character data on the document as the image sensor passes over and images the document.

3. The apparatus according to claim 2, wherein each of the image sensor and the document includes
  a width, wherein the width of the image sensor is greater than the width of the document in order to permit the image sensor to image an entire surface of the document as the image sensor is moved past the document.

4. The apparatus of claim 1, wherein the MICR subsystem further comprises
  a dual-channel read head that includes both of the MICR read head and the speed sensing magnetic read head.

5. The apparatus of claim 1, wherein the series of embedded magnetic markers of the base includes
  magnetic material magnetized by a permanent magnet that is embedded in the base.

6. The apparatus of claim 5, wherein the magnetic material includes
  MICR ink.

7. The apparatus of claim 1, wherein the series of embedded magnetic markers include
  magnetic tape affixed to the base.

8. The apparatus of claim 1, wherein the series of embedded magnetic markers include
  a magnetic strip positioned along the base.

9. The apparatus according to claim 1, wherein the base includes a length, wherein the series of embedded magnetic markers are arranged along substantially all of the length of the base.

10. The apparatus according to claim 1, wherein the signal communicated to the MICR reading and recognition logic from the MICR read head is compared against MICR character peak profiles in order to permit the MICR reading and recognition logic to determine recognized MICR characters.

11. An apparatus for processing a document including magnetic ink character data, comprising:
  a hand-operated document processor including a base including a support surface for supportably-receiving the document, and a series of embedded magnetic markers arranged alongside a location where the document is supportably-received by the support surface; and
  a manually operated magnetic ink character recognition (MICR) and imaging subsystem movably-attached to the base such that the manually operated MICR and imaging subsystem is movable relative to the document, wherein the manually operated MICR and imaging subsystem includes
    an image sensor,
    MICR reading and recognition logic,
    a MICR read head, and
    a speed sensing magnetic read head, wherein movement of the manually operated MICR and imaging subsystem permits the image sensor to image the document as:
      (1) the MICR read head passes over the magnetic ink character data on the document for generating a signal that is sent to the MICR reading and recognition logic, and
      (2) the speed sending magnetic read head passes over the series of magnetic markers for generating a position signal that is sent to the MICR reading and recognition logic.

12. The apparatus according to claim 11, wherein each of the image sensor and the document includes
  a width, wherein the width of the image sensor is greater than the width of the document in order to permit the image sensor to image an entire surface of the document as the image sensor is moved past the document.

13. The apparatus of claim 11, wherein the manually operated MICR and imaging subsystem further comprises a dual-channel read head that includes both of the MICR read head and the speed sensing magnetic read head.

14. The apparatus of claim 11, wherein the series of embedded magnetic markers of the base includes
magnetic material magnetized by a permanent magnet that is embedded in the base.

15. The apparatus of claim 14, wherein the magnetic material includes
MICR ink.

16. The apparatus of claim 11, wherein the series of embedded magnetic markers include
magnetic tape affixed to the base.

17. The apparatus of claim 11, wherein the series of embedded magnetic markers include
a magnetic strip positioned along the base.

18. The apparatus of claim 11, wherein the MICR reading and recognition logic samples the signal from the MICR read head at a sampling rate based on sensed speed of movement of the manually operated MICR and imaging subsystem relative to the base, wherein the sensed speed of movement is determined by the MICR reading and recognition logic in view of the position signal generated by the speed sensing magnetic read head.

19. The apparatus according to claim 11, wherein the base includes a length, wherein the series of embedded magnetic markers are arranged along substantially all of the length of the base.

20. The apparatus according to claim 11, wherein the signal communicated to the MICR reading and recognition logic from the MICR read head is compared against MICR character peak profiles in order to permit the MICR reading and recognition logic to determine recognized MICR characters.

21. An apparatus for processing a document including magnetic ink character data, comprising:
a hand-operated document processor including
a base including
a series of embedded optical markers, and
a support surface for supportably-receiving the document; and
a magnetic ink character recognition (MICR) subsystem movably-attached to the base such that the MICR subsystem is movable relative to the document, wherein the MICR subsystem includes
a MICR read head;
MICR reading and recognition logic communicatively-coupled with the MICR read head for receiving a signal from the MICR read head, and
a speed sensing reflective optical sensor positioned for communication with the series of optical markers of the base for providing position feedback information to the MICR reading and recognition logic for use during character data recognition as the MICR read head passes over the document including the magnetic ink character data.

22. The apparatus of claim 21, wherein the MICR subsystem further comprises
an image sensor, wherein the image sensor is coupled to the MICR read head such that the MICR read head is permitted to pass over the magnetic ink character data on the document as the image sensor passes over and images the document.

23. The apparatus according to claim 22, wherein each of the image sensor and the document includes
a width, wherein the width of the image sensor is greater than the width of the document in order to permit the image sensor to image an entire surface of the document as the image sensor is moved past the document.

24. The apparatus of claim 21, wherein the series of embedded optical markers include
a linear strip affixed to the base arranged alongside a location where the document is supportably-received by the support surface.

25. The apparatus of claim 21, wherein the MICR reading and recognition logic samples the signal from the MICR read head at a sampling rate based on sensed speed of movement of the MICR subsystem relative to the base, wherein the sensed speed of movement is determined by the MICR reading and recognition logic in view of a position feedback signal generated by the speed sensing reflective optical sensor.

26. The apparatus of claim 21, further comprising:
a pad attached to the MICR subsystem, wherein the pad is in direct contact with the series of embedded optical markers for wiping the series of embedded optical markers as the MICR subsystem is moved relative to the base.

27. The apparatus according to claim 26, wherein the series of embedded optical markers includes
a film substrate including a upper surface and a lower surface,
a non-reflective, high-resolution line-pair pattern applied to the lower surface of the film substrate, and
a reflective background applied over the non-reflective, high-resolution line-pair pattern.

28. The apparatus according to claim 27, wherein the film substrate includes polyester.

29. The apparatus according to claim 27, wherein the series of embedded optical markers are connected to the base such that the upper surface of the film substrate is not disposed adjacent the and faces away from the support surface of the base.

30. The apparatus according to claim 29, wherein the pad is in direct contact with the upper surface of the film in order to protect the non-reflective, high-resolution line-pair pattern as the pad wipes the series of embedded optical markers as the MICR subsystem is moved relative to the base.

31. The apparatus according to claim 27, wherein the non-reflective, high-resolution line-pair pattern are applied to the lower surface of the film substrate such that each line of the non-reflective, high-resolution line-pair pattern is separated from a neighboring line by approximately 0.002 inches.

32. The apparatus of claim 21, wherein the speed sensing reflective optical sensor includes
a dual-channel quadrature sensor.

33. The apparatus according to claim 21, wherein the base includes a length, wherein the series of embedded optical markers are arranged along substantially all of the length of the base.

34. The apparatus according to claim 21, wherein the signal communicated to the MICR reading and recognition logic from the MICR read head is compared against MICR character peak profiles in order to permit the MICR reading and recognition logic to determine recognized MICR characters.

* * * * *